US012794233B2

(12) United States Patent
Liang

(10) Patent No.: US 12,794,233 B2
(45) Date of Patent: Nov. 10, 2026

(54) POWER CONTROL SYSTEM AND POWER CONTROL METHOD THEREOF

(71) Applicant: Yung-Chang Liang, Taipei City (TW)

(72) Inventor: Yung-Chang Liang, Taipei City (TW)

( * ) Notice: Subject to any disclaimer, the term of this patent is extended or adjusted under 35 U.S.C. 154(b) by 508 days.

(21) Appl. No.: 18/383,658

(22) Filed: Oct. 25, 2023

(65) Prior Publication Data

US 2024/0136819 A1 Apr. 25, 2024
US 2024/0235196 A9 Jul. 11, 2024

(30) Foreign Application Priority Data

Oct. 25, 2022 (TW) ................................. 111140457

(51) Int. Cl.
*H02J 3/17* (2026.01)
*H02J 3/00* (2006.01)

(52) U.S. Cl.
CPC ................ *H02J 3/17* (2026.01); *H02J 3/003* (2020.01)

(58) Field of Classification Search
None
See application file for complete search history.

(56) References Cited

U.S. PATENT DOCUMENTS 9,091,245 B2 * 7/2015 Lobato ...................... F03D 9/25
10,120,401 B2 * 11/2018 Song ......................... G05F 1/66
2011/0291479 A1 * 12/2011 Lee ......................... H02J 3/381 307/43
2012/0095606 A1 * 4/2012 Besore ................ A47L 15/0047 700/291
2013/0151024 A1 * 6/2013 Bae ........................... H02J 3/14 700/295
2013/0162037 A1 * 6/2013 Kim ........................ H02J 3/003 307/24
2013/0169046 A1 * 7/2013 Shin .......................... H02J 9/00 307/66

(Continued)

FOREIGN PATENT DOCUMENTS

CA 3091569 A1 * 8/2019 ............. H02J 13/13
CN 107710540 A 2/2018

(Continued)

OTHER PUBLICATIONS

Search Report issued in Taiwan priority application 111140457, dated Apr. 11, 2023.

*Primary Examiner* — Howard Cortes
(74) *Attorney, Agent, or Firm* — Birch, Stewart, Kolasch & Birch, LLP

(57) ABSTRACT

A power control system includes a database, a processing module, and a control module, wherein the database stores a load control data. A power control method comprises build the load control data including a plurality of control modes; receive an environmental incident information through the processing module and select one of the control modes in the load control data corresponding to the environmental incident information according to the environmental incident information through the processing module; and control each of a plurality of loads to run through a control module according to an activation priority order of each of the loads in the control mode selected by the processing module. Therefore, the activation priority order of each of the loads could be controlled more effectively depending on different environmental incidents.

14 Claims, 5 Drawing Sheets

(56) References Cited

U.S. PATENT DOCUMENTS

| | | | | |
|---|---|---|---|---|
| 2013/0231790 | A1* | 9/2013 | Shao | G06Q 10/10<br>700/291 |
| 2014/0018969 | A1* | 1/2014 | Forbes, Jr. | G05F 1/66<br>700/295 |
| 2015/0061386 | A1* | 3/2015 | Dibachi | H02J 3/32<br>307/23 |
| 2015/0295411 | A1* | 10/2015 | Courtney | G05B 15/02<br>700/295 |
| 2017/0373504 | A1* | 12/2017 | Woo | H02J 3/32 |
| 2018/0027630 | A1* | 1/2018 | DeJonge | H02J 9/061<br>315/86 |
| 2018/0203591 | A1* | 7/2018 | Callen | G06F 3/04847 |
| 2018/0259922 | A1* | 9/2018 | Nill | G05B 19/042 |
| 2019/0024918 | A1* | 1/2019 | Brissette | F24F 11/46 |
| 2021/0320495 | A1* | 10/2021 | Forbes | G06Q 30/0202 |
| 2023/0125152 | A1* | 4/2023 | Eriksen | H01H 71/04<br>361/42 |

FOREIGN PATENT DOCUMENTS

| | | | |
|---|---|---|---|
| JP | 4855982 | B2 * | 1/2012 |
| TW | 201541238 | A | 11/2015 |
| TW | 201638894 | A | 11/2016 |
| TW | 201901470 | A | 1/2019 |

* cited by examiner

| Predetermined environmental incident type | Water outage | | | Power outage | | | Low temperature |
|---|---|---|---|---|---|---|---|
| Control mode / Load name | Mode 1-1 | Mode 1-2 | Mode 1-3 | Mode 2-1 | Mode 2-2 | Mode 2-3 | Mode 3 |
| Water pump of water tower | P1 | X | P1 | P1 | X | P2 | P2 |
| Standby energy storage cabinet | P2 | P2 | P2 | P1 | P1 | P1 | P2 |
| Air conditioning equipment | P2 | P1 | P1 | P2 | P2 | P2 | P1 |

Activation priority order：P1：First priority；P2：First priority；X：Not running

FIG.3

POWER CONTROL SYSTEM AND POWER CONTROL METHOD THEREOF

BACKGROUND OF THE INVENTION

Technical Field

The present invention relates generally to power control of loads of an electricity consuming field, and more particularly to a power control system and a power control method thereof.

Description of Related Art

With the development of economy and technology, demands for electricity increases year by year. In an electricity consuming field, such as a community building, an office building, a factory, etc., the number of loads gradually increases, and when the large number of the loads run simultaneously, which makes a power consumption too large, a power grid may require to provide a large amount of power, causing a burden to the power grid.

Additionally, when an environmental incident occurs in the electricity consuming field, such as a water outage, a power outage, etc., inconveniences to the electricity consuming field are resulted. Even when people in the electricity consuming field acknowledge the information of the water outage or the power outage in advance, manually controlling the loads to run is still required.

BRIEF SUMMARY OF THE INVENTION

In view of the above, the primary objective of the present invention is to provide a power control system and a power control method thereof, which could control an activation priority order of loads corresponding to environmental incidents more effectively.

The present invention provides a power control system, which is applied to an electricity consuming field, wherein a plurality of loads is disposed in the electricity consuming field and is controllable to run. The power control system includes a database, a processing module, and a control module, wherein the database stores a load control data including a plurality of control modes. In each of the control modes, each of the loads has an activation priority order, and the activation priority order of at least a part of the loads in one of the control modes is different from the activation priority order of at least a part of the loads in another one of the control modes. The processing module is wirelessly connected to at least one data source and receives an environmental incident information from the at least one data source, and selects one of the control modes in the load control data corresponding to the environmental incident information based on the environmental incident information. The control module is wirelessly connected to the loads and the processing module, and controls each of the loads to run according to the activation priority order of each of the loads in the control mode selected by the processing module.

The present invention further provides a power control method, which is applied to an electricity consuming field, wherein a plurality of loads is disposed in the electricity consuming and is controllable to run; the power control method includes:

build a load control data including a plurality of control modes, wherein in each of the control modes, each of the loads has an activation priority order, and the activation priority order of at least a part of the loads is different from the activation priority order of at least a part of the loads in another one of the control modes;

a mode selection step including receive an environmental incident information from at least one date source through a processing module and select one of the control modes corresponding to the environmental incident information according to the environmental incident information through the processing module; and a control step including control each of the loads to run through a control module according to the activation priority order of each of the loads in the control mode selected by the processing module.

With the aforementioned design, through correspondingly selecting the control mode according to the environmental incident information received, the activation priority order of each of the loads corresponding to different environmental incidents could be classified in advance, making the power supply to the electricity consuming field more flexible and reducing the burden to the power grid, and allocating power more effectively.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 3 is a schematic view showing the load control information according to the first embodiment of the present invention;

DETAILED DESCRIPTION OF THE INVENTION

Figure 1:
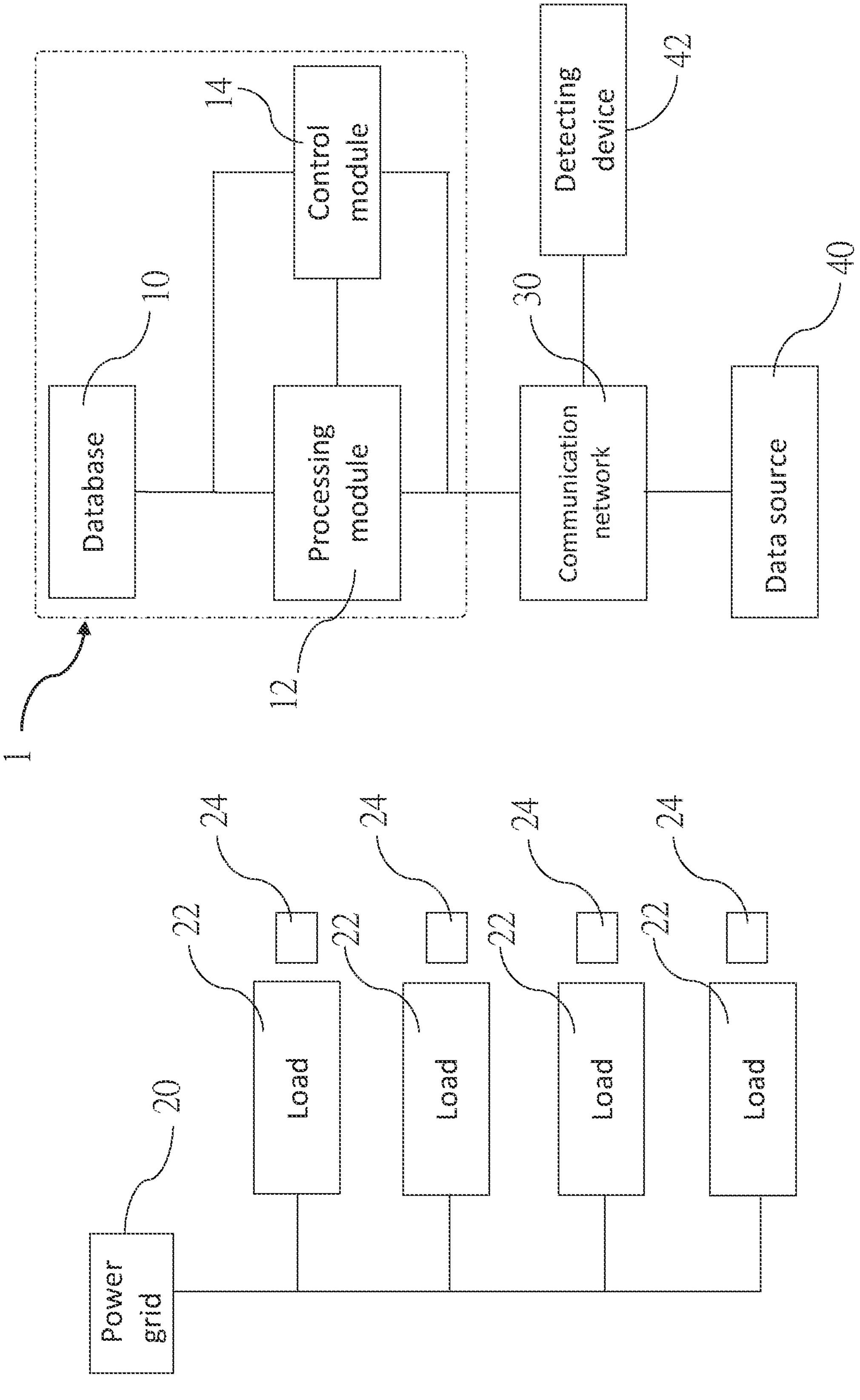
FIG. 1 is a schematic view showing the power control system and the loads of the electricity consuming field connecting to the power grid according to a first embodiment of the present invention.

A power control system 1 according to a first embodiment of the present invention is illustrated in FIG. 1 and is applied to an electricity consuming field, wherein a plurality of loads 22 is disposed in the electricity consuming field and is connected to a power grid 20. In the current embodiment, the electricity consuming field is a residential building as an example, but not limited thereto. The electricity consuming field could be an office building or an electricity consuming field having a plurality of loads 22 as well.

In the current embodiment, the loads 22 could be, but not limited to, a water pump of a water tower, a standby energy storage cabinet, an air conditioning equipment, a vehicle charging station, a communication equipment (such as a network equipment and a telecommunication equipment), etc. The loads 22 are connected to a communication network 30, such as an internet or a local network, and could be controlled to run or stop, wherein the run includes activating the loads 22 or adjusting a power consumption of the activated loads 22.

Additionally, a plurality of detecting devices 24 is selectively disposed in the electricity consuming field and respectively detects whether the corresponding one of the loads 22 needs to run, and generates an operation request signal to request activating the corresponding one of the loads 22 when the corresponding one of the loads 22 needs to run, or to request adjusting a power consumption of the corresponding one of the activated loads 22, e.g. increasing the power consumption. For example, one of the detecting devices 24 corresponding to the water pump of the water tower could be a level sensor in the water tower, and could generate the operation request signal when the water tower is at a low water level; one of the detecting devices 24 corresponding to the air conditioning equipment could be an indoor temperature sensor, and could generate the operation request signal to request activating the air conditioning equipment or increasing a power consumption of the air conditioning equipment to increase an indoor temperature more rapidly when the temperature sensor detects the indoor temperature is too low. The detecting devices 24 corresponding to the loads 22 could communicate with the communication network 30 for sending the operation request signal.

In an embodiment, a part of the loads 22 could generate the operation request signal by themselves when the part of the loads 22 needs to run, and the operation request signal is sent through the communication network 30. For example, the standby energy storage cabinet generates the operation request signal to request charging when a voltage of an internal accumulator of the standby energy storage cabinet is insufficient; the vehicle charging station generates the operation request signal to request outputting a charging electricity to an electric vehicle when connected to the electric vehicle.

The power control system 1 includes a database 10, a processing module 12, and a control module 14 respectively and wirelessly connected to one another, wherein the control module 14 is wirelessly connected to the loads 22. In the current embodiment, the processing module 12 and the control module 14 are connected to the communication network 30, and the processing module 12 is wirelessly connected to at least one data source 40, such as connecting to the at least one data source 40 through the communication network 30. The control module 14 sends a control signal to the loads 22 through the communication network 30 for controlling the loads 22 to run or stop. The power control system 1 is connected to and powered by an uninterruptible power supply, thereby could operate smoothly even when no power supply in the power grid 20.

In practice, the database 10, the processing module 12, and the control module 14 could be integrated into a server as well.

Figure 2:
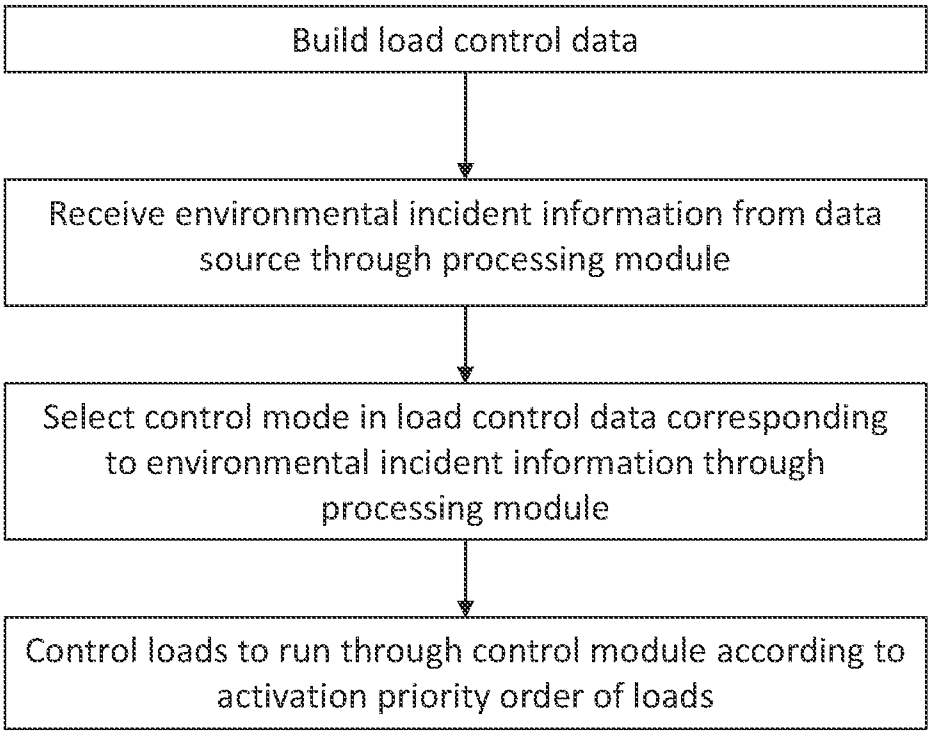
FIG. 2 is a flowchart of the power control method according to the first embodiment of the present invention.

The power control system 1 is configured to apply a power control method according to the first embodiment of the present invention shown in FIG. 2. The power control method will be explained together with the power control system 1 as follow.

A load control data is built in the database 10 and includes a plurality of control modes, wherein in each of the control modes, each of the loads 22 has an activation priority order, and the activation priority order of at least a part of the loads 22 in one of the control modes is different from the activation priority order of the at least a part of the loads 22 in another one of the control modes. In the current embodiment, a plurality of predetermined environmental incident types is built in the database 10, wherein each of the predetermined environmental incident types corresponds to at least one of the control modes. The loads 22 could be classified in the load control data in advance by a manager, and the load control data could be built in the database 10 by connecting the power control system 1 with an electronic device.

Referring to FIG. 3, for example, the predetermined environmental incident types include, for example, a water outage type, a power outage type, a low temperature type, and the loads 22 are the water pump of the water tower, the standby energy storage cabinet, and the air conditioning equipment as an example.

The water outage type corresponds to at least two of the control modes, i.e., a mode 1-1 (a first control mode) and a mode 1-2 (a second control mode). In the current embodiment, the water outage type further selectively includes a mode 1-3 (a third control mode). The power outage type corresponds to at least two of the control modes, i.e., a mode 2-1 (a first control mode) and a mode 2-2 (a second control mode). In the current embodiment, the power outage type further selectively includes a mode 2-3 (a third control mode). The low temperature type corresponds to one of the control modes, i.e., a mode 3.

In each of the control modes, the activation priority order of the loads 22 at least includes, but not limited to, a first priority or a second priority. In an embodiment, the activation priority order of a part of the loads 22 could be a third priority, a fourth priority, or more. The higher the activation priority order is, the higher priority to be allowed to run the corresponding load 22 is.

A mode selection step is performed after building the load control data in the database 10.

In the mode selection step, the processing module 12 receives an environmental incident information from the at least one data source 40. In the current embodiment, the at least one data source 40 include at least one public information website, such as the websites of electric power companies, water companies, weather bureaus, etc., wherein the environmental incident information obtained from the at least one data source 40 by the processing module 12 includes a water outage information, a power outage information, a meteorological information (low temperature, wind disaster, earthquake, etc.), etc. The at least one data source 40 could be the electronic device of the manager of the electricity consuming field, wherein the manager collects the aforementioned environmental incident information through the electronic device and sends the environmental incident information to the processing module 12.

Additionally, the electricity consuming field could selectively include a data source, such as a detecting device 42, wherein the detecting device 42 corresponding to the power grid 20 is electrically connected to the power grid 20 and is configured to detect a power state of the power grid 20 of the electricity consuming field (e.g. frequency, voltage, current, power, power factor, volt-ampere reactive value, phase, etc, and the detecting device 42 corresponding to the power grid 20 could be wirelessly connected to the processing module 12 directly or through the communication network 30. In this way, when a power state abnormality occurs in the power grid 20 (e.g. tripping, abnormal fluctuation of the frequency, the voltage, or the current of the power grid 20, abnormality of the power, the volt-ampere reactive value, or the power factor of the loads of the power grid 20, phase error of the power grid 20, etc.), which makes the detecting device 42 corresponding to the power grid 20 detect that the power grid 20 generates the aforementioned abnormalities or no power supply, the detecting device 42 corresponding to the power grid 20 generates an environmental incident information corresponding to the different power state abnormalities. Then, when the power supply in the power grid 20 is restored to normal, the detecting device 42 corresponding to the power grid 20 generates an environmental incident information corresponding to the power state restoring to normal. The detecting device 42 corresponding to the power grid 20 could be powered by the uninterruptible power supply.

The processing module 12 selects one of the control modes in the load control data corresponding to the predetermined environmental incident type according to the environmental incident information obtained. In the current embodiment, the processing module 12 matches the environmental incident information obtained with the predetermined environmental incident types of the database 10, and when the processing module 12 determines that the environmental incident information obtained matches with one of the predetermined environmental incident types, the processing module 12 correspondingly selects one of the control modes according to the matched predetermined environmental incident type.

The environmental incident information includes a beginning time and an expiry time of an environmental incident. For example, the water outage information includes a predetermined beginning time and a predetermined expiry time of the water outage of the electricity consuming field; the power outage information includes a predetermined beginning time and a predetermined expiry time of the power outage of the electricity consuming field; the low temperature information includes a predetermined beginning time and a predetermined expiry time of the electricity consuming field affected by a cold air mass.

For some environmental incident information, such as the water outage information or the power outage information, the processing module 12 correspondingly selects the first control mode according to the matched predetermined environmental incident type during a predetermined time before the beginning time of the environmental incident, wherein the predetermined time could be between 3 hours and 6 hours as an example; the processing module 12 sends the matched predetermined environmental incident type and the activation priority order of each of the loads 22 in the first control mode to a mobile device of the manager or a resident, thereby notifying the manager and the resident in advance for preparing for the environmental incident.

At the beginning time of the environmental incident, the processing module 12 correspondingly selects the second control mode according to the matched predetermined environmental incident type, and sends the matched predetermined environmental incident type and the activation priority order of each of the loads 22 in the second control mode to the mobile device.

Additionally, at the expiry time of the environmental incident, the processing module 12 could further correspondingly select the third control mode matching with the predetermined environmental incident type, and send the matched predetermined environmental incident type and the activation priority order of each of the loads 22 in the third control mode to the mobile device.

For some environmental incident information, such as the low temperature information, at the beginning time of the environmental incident, the processing module 12 correspondingly selects one of the control modes matching with the predetermined environmental incident type, and sends the matched predetermined environmental incident type and the activation priority order of each of the loads 22 in the control mode to the mobile device.

After the mode selection step, a control step is performed, wherein in the control step, the control module 14 controls each of the loads 22 to run according to the activation priority order of each of the loads 22 in one of the control modes selected by the processing module 12. For example, the processing module 12 sends the selected control mode (including the activation priority order) to the control module 14, or the processing module 12 marks the currently selected control mode in the database 10 and then notifies the control module 14 to select the control mode marked by the processing module 12 in the database 10.

How the power control system 1 reacts to different environmental incident information is illustrated with examples as follow.

The Water Outage Information

Referring to FIG. 3, in the mode selection step, when the processing module 12 determines that the environmental incident information received matches with the water outage type, the processing module 12 selects the mode 1-1 (the first control mode) during the predetermined time (e.g. 4 hours) before the beginning time of the environmental incident. In the control step, the control module 14 controls each of the loads 22 to run according to the activation priority order of each of the loads 22 in the mode 1-1, i.e., controls the water pump of the water tower to run in the first priority; for example, the water tower is continuously forced to be fully filled with water during 4 hours before the beginning time of the environmental incident, instead of activating the water pump of the water tower when the level monitor detects that the water tower is at a low water level.

At the beginning time of the environmental incident, in the mode selection step, the processing module 12 selects the mode 1-2 (the second control mode), wherein the activation priority order of the water pump of the water tower is not running or the last. In the control step, when the water pump of the water tower or the detecting device 24 corresponding to the water tower sends the operation request signal, the control module 14 does not control the water pump of the water tower to run as the activation priority order of the water pump of the water tower is not running or the last. When the detecting devices 24 corresponding to other loads 22 or the other loads 22 send the operation request signal, the control module 14 controls each of the loads 22 to run according to the activation priority order of each of the loads 22 in the mode 1-2.

At the expiry time of the environmental incident, in the mode selection step, the processing module 12 selects the mode 1-3 (the third control mode), and the water tower may be at a low water level as the water pump of the water tower does not run during the water outage. In the control step, the control module 14 makes the water pump of the water tower to run in the first priority to refill the water tower according to the mode 1-3.

The Power Outage Information

Referring to FIG. 3, in the mode selection step, when the processing module 12 determines that the environmental incident information received matches with the power outage type, the processing module 12 selects the mode 2-1 (the first control mode) during the predetermined time (e.g. 4 hours) before the beginning time of the environmental incident. In the control step, the control module 14 controls each of the loads 22 to run according to the activation priority order of each of the loads 22 in the mode 2-1, i.e., controls the water pump of the water tower and the standby energy storage cabinet to run in the first priority; for example, the water tower is continuously forced to be fully filled with water and the standby energy storage cabinet is continuously charged to a fully charged state during 4 hours before the beginning time of the environmental incident.

At the beginning time of the environmental incident, in the mode selection step, the processing module 12 selects the mode 2-2 (the second control mode), wherein the activation priority order of the water pump of the water tower is not running or the last. In the control step, the control module 14 controls each of the loads 22 to run according to the activation priority order of each of the loads 22 in the mode 2-2, and controls the standby energy storage cabinet to supply power to other loads 22 that require the power supply (e.g. an emergency elevator and an emergency lighting equipment).

At the expiry time of the environmental incident, in the mode selection step, the processing module 12 selects the mode 2-3 (the third control mode). In the control step, the control module 14 controls the standby energy storage cabinet to run in the first priority according to the mode 1-3 for recharging the standby energy storage cabinet.

Additionally, when the detecting device 42 corresponding to the power grid 20 detects that the power grid 20 having no power supply and generates the environmental incident information corresponding to the abnormal power supply, and the processing module 12 selects the mode 2-2 as the control mode for the abnormal power supply upon receiving the environmental incident information corresponding to the abnormal power supply. In the control step, the control module 14 controls each of the loads 22 to run according to the activation priority order of each of the loads 22 in the mode 2-2.

When the power supply in the power grid 20 is restored to normal, the detecting device 42 corresponding to the power grid 20 generates the environmental incident information corresponding to the power restoration, and the processing module 12 selects the mode 2-3 as the control mode for the power restoration upon receiving the environmental incident information corresponding to the power restoration. In the control step, the control module 14 controls each of the loads 22 to run according to the activation priority order of each of the loads 22 in mode 2-3.

The Low Temperature Information

Referring to FIG. 3, in the mode selection step, the processing module 12 determines the environmental incident information received matches with the low temperature type, the processing module 12 selects the mode 3 at the beginning time of the environmental incident. In the control step, the control module 14 controls each of the loads 22 to run according to the activation priority order of each of the loads 22 in the mode 3 and makes the air conditioning equipment run in priority; for example, when the detecting device 24 corresponding to the air conditioning equipment detects that the indoor temperature being too low and sends the operation request signal, the control module 14 controls the air conditioning equipment to provide warm air in priority.

In each of the control modes, when two environmental incidents occur at the same time, the processing module 12 could generate a new activation priority order corresponding to the two predetermined environmental incident types. For example, before the water outage begins, the mode 1-1 is applied to make the water pump of the water tower run in the first priority; when the processing module 12 receives a new environmental incident information for the power outage while the water pump of the water tower is running, the processing module 12 adjusts the standby energy storage cabinet from the second priority in the mode 1-1 (the first control mode) corresponding to the water outage type to the first priority to run, and forms a new control mode corresponding to the two simultaneous predetermined environmental incident types, and then the control module 14 controls each of the loads 22 to run according to the new control mode, making the water pump of the water tower to run and charging the standby energy storage cabinet in priority. Preferably, when the activation priority order of one of the loads 22 in one of the two original control modes is in high priority, the activation priority order of the corresponding load 22 in the new control mode is still in high priority.

In an embodiment, in the control step, when the control module 14 receives the operation request signal from any one of the loads 22 and determines that the activation priority order of the load 22 corresponding to the operation request signal is the first priority, the control module 14 controls the loads 22 corresponding to the operation request signal to run. When the control module 14 determines that the activation priority order of the load 22 corresponding to the operation request signal is the second priority, and the load 22 in the first priority is not running, the control module 14 controls the load 22 in the second priority corresponding to the operation request signal to run.

For example, during the predetermined time before the beginning time of the water outage, the water pump of the water tower runs in the first priority; when the water tower is fully filled, the water pump of the water tower stops, and at that time when the control module 14 receives the operation request signal of the standby energy storage cabinet (the second priority), the control module 14 controls the standby energy storage cabinet to run for charging the standby energy storage cabinet as the water pump of the water tower is not running.

In an embodiment, while the control module 14 controls each of the loads 22 to run according to the activation priority order of each of the loads 22 in the load control information, the processing module 12 could further determine a regular power consumption of each of the loads 22 in each of the control modes and adjust the activation priority order according to the regular power consumption of each of the loads 22 in each of the control modes. For example, during the predetermined time (e.g. 4 hours) before the beginning time of the water outage, the processing module 12 selects the mode 1-1 (the first control mode), i.e., the water pump of the water tower is controlled to run in the first priority; however, when a power consumption of the air conditioning equipment is larger than a threshold of the regular power consumption, which indicates that the air conditioning equipment regularly requires power before the water outage, the air conditioning equipment is adjusted from the second priority originally in the mode 1-1 to the first priority to run. Therefore, the activation priority order of each of the loads 22 could be adjusted according to an actual power consumption habit of the electricity consuming field.

Figure 4:
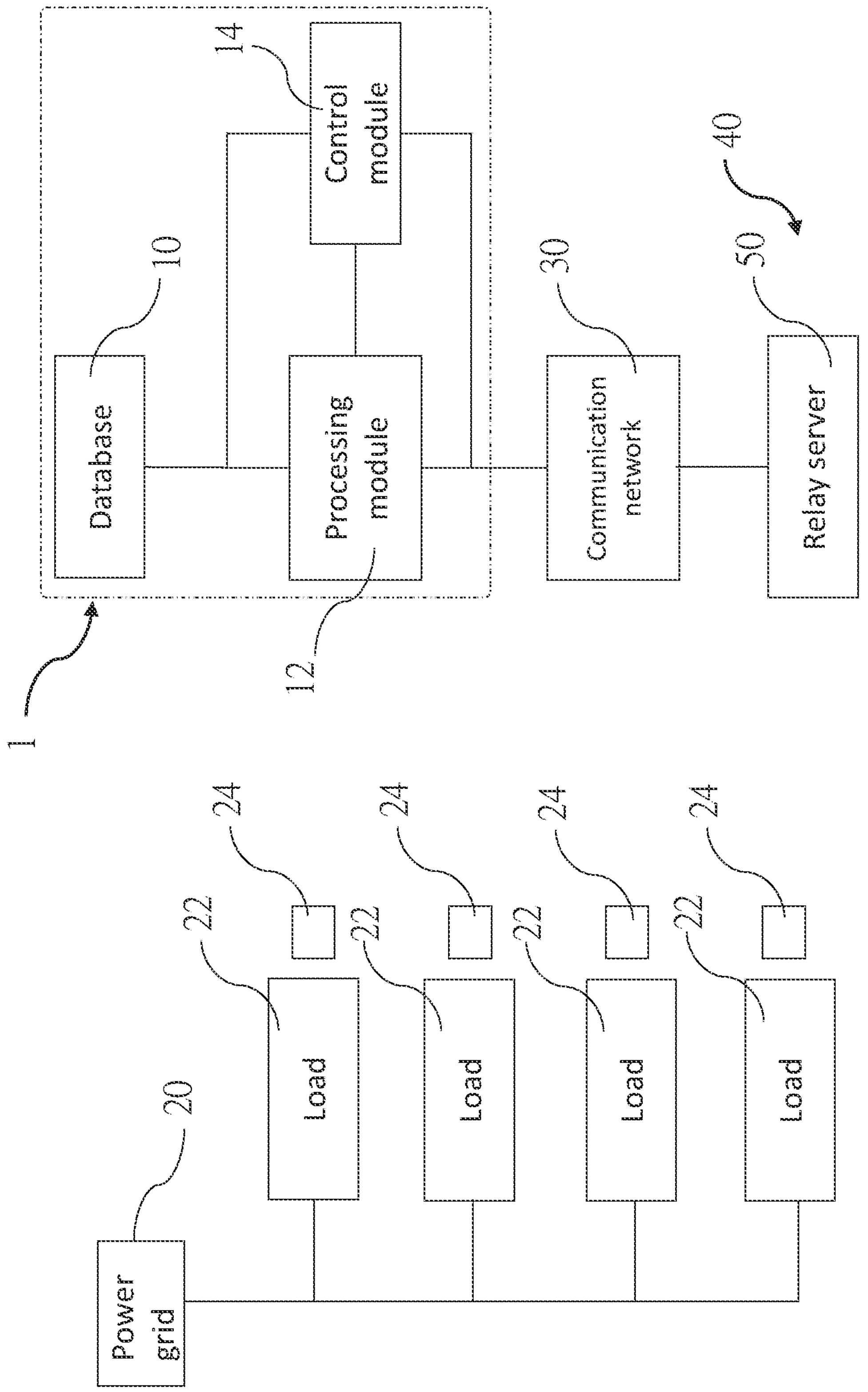
FIG. 4 is a schematic view showing the power control system and the loads of the electricity consuming field connecting to the power grid according to a second embodiment of the present invention.

A power control system according to a second embodiment of the present invention is illustrated in FIG. 4 and is based on the first embodiment, wherein the at least one data source 40 could further include a relay server 50, and the communication network 30 could be a local network, wherein the environmental incident information is obtained through the relay server 50 by connecting to the public information websites via an internet, and is sent by the relay server 50 to the processing module 12 through the communication network 30.

Figure 5:
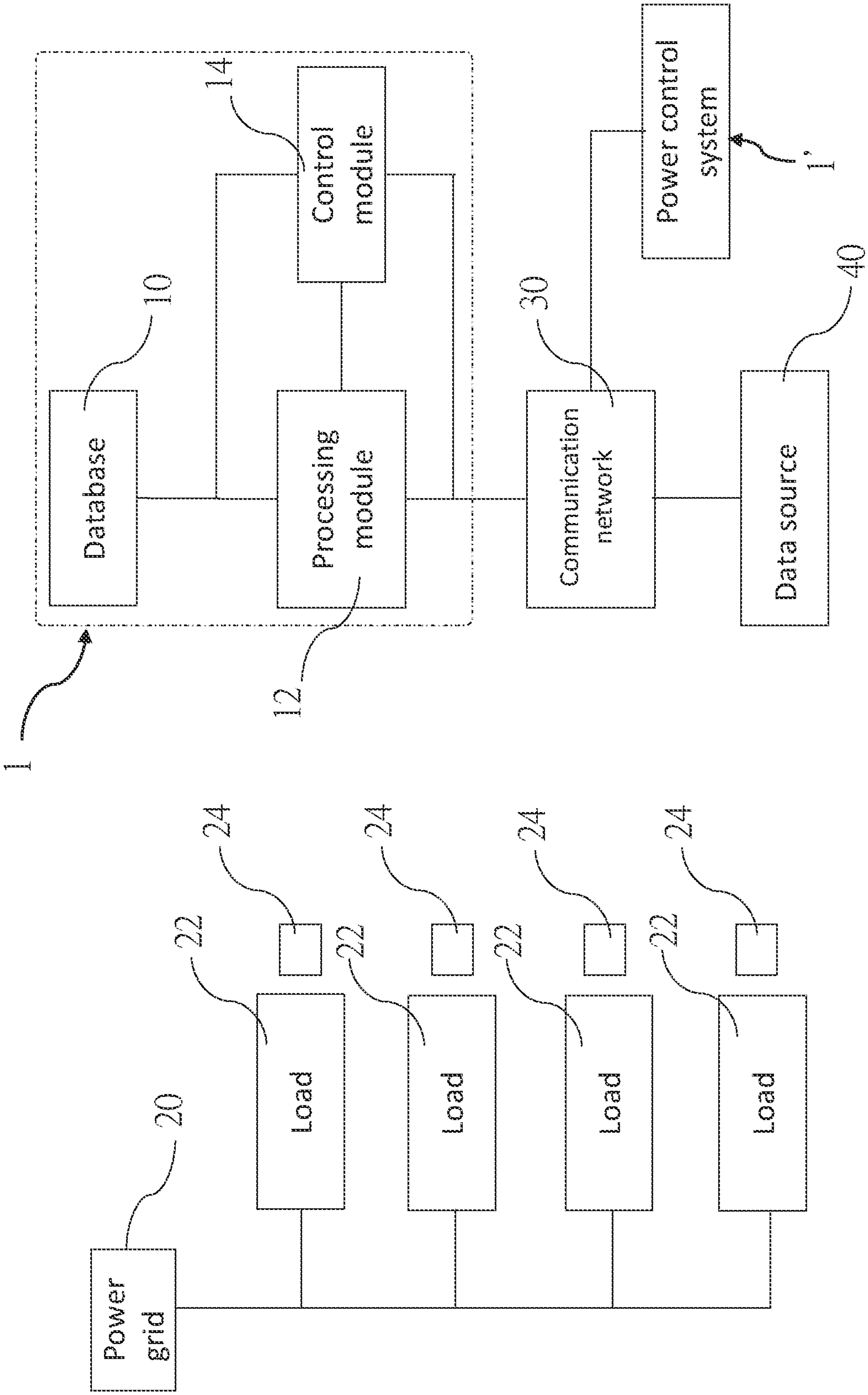
FIG. 5 is a schematic view showing the power control system and the loads of the electricity consuming field connecting to the power grid according to a third embodiment of the present invention.

A power control system 1 according to a third embodiment of the present invention is illustrated in FIG. 5 and is based on the first embodiment, wherein the electricity consuming field further communicates with another power control system 1' of an adjacent electricity consuming field through the communication network 30. The another power control system 1' is taken as another data source 40 of the power control system 1 and could send an environmental incident information received to the processing module 12 of the power control system 1. When the processing module 12 does not receive the environmental incident information of the at least one data source 40, but receives the environmental incident information from the another power control system 1', the processing module 12 could send an inquiry message to the mobile device of the manager or the resident to ask the manager or the resident whether each of the loads 22 could be controlled according to the environmental incident information sent from the another power control system 1'. When the manager or the resident confirms to control the loads 22 according to the environmental incident information sent from the another power control system", the processing module 12 selects the control mode corresponding to the environmental incident information sent from the another power control system 1', and the control module 14 controls each of the loads 22 according to the activation priority order of each of the loads 22 in the corresponding control mode.

With the aforementioned design, through collecting the environmental incident information and matching the environmental incident information with the database, the power control system and the power control method of the present invention could classify the activation priority order of each of the loads of the electricity consuming field, achieving the effective load control corresponding to the environmental incident of the environmental incident types and thereby reducing the influence of the environmental incidents towards the electricity consuming field.

It must be pointed out that the embodiments described above are only some preferred embodiments of the present invention. All equivalent structures and methods which employ the concepts disclosed in this specification and the appended claims should fall within the scope of the present invention.

What is claimed is:

1. A power control system, which is applied to an electricity consuming field, wherein a plurality of loads is disposed in the electricity consuming field and is controllable to run; the power control system comprising:

a database storing a load control data, wherein the load control data comprises a plurality of control modes; in each of the plurality of control modes, each of the plurality of loads has an activation priority order, and the activation priority order of at least a part of the plurality of loads in one of the plurality of control modes is different from the activation priority order of at least a part of the plurality of loads in another one of the plurality of control modes; the activation priority order of the plurality of loads of each of the plurality of control modes at least comprises either a first priority or a second priority;

a processing module wirelessly connected to at least one data source and receiving an environmental incident information from the at least one data source, and selecting one of the plurality of control modes in the load control data corresponding to the environmental incident information based on the environmental incident information; and a control module wirelessly connected to the plurality of loads and the processing module, and controlling each of the plurality of loads to run according to the activation priority order of each of the plurality of loads in the control mode selected by the processing module; when the control module receives an operation request signal corresponding to any one of the plurality of loads, and determines that the activation priority order of the load corresponding to the operation request signal is the first priority, the control module controls the load corresponding to the operation request signal to run; when the control module receives the operation request signal corresponding to any one of the plurality of loads, and determines that the activation priority order of the load corresponding to the operation request signal is the second priority, and the load in the first priority is not running, the control module controls the load in the second priority corresponding to the operation request signal to run.

2. The power control system as claimed in claim 1, wherein a plurality of different predetermined environmental incident types is stored in the database, and each of the plurality of predetermined environmental incident types corresponds to at least one of the plurality of control modes; when the processing module determines that the environmental incident information matches with one of the plurality of predetermined environmental incident types, the processing module correspondingly selects at least one of the plurality of control modes according to the matched predetermined environmental incident type.

3. The power control system as claimed in claim 2, wherein at least one of the plurality of predetermined environmental incident types corresponds to at least two of the plurality of control modes comprising a first control mode and a second control mode; the environmental incident information comprises a beginning time of an environmental incident; during a predetermined time before the beginning time of the environmental incident, the processing module correspondingly selects the first control mode according to the matched predetermined environmental incident type, and the control module controls each of the plurality of loads to run according to the activation priority order of each of the plurality of loads in the first control mode; at the beginning time of the environmental incident, the processing module correspondingly selects the second control mode according to the matched predetermined environmental incident type, and the control module controls each of the plurality of loads to run according to the activation priority order of each of the plurality of loads in the second control mode.

4. The power control system as claimed in claim 3, wherein the at least two of control modes corresponding to the at least one of the plurality of predetermined environmental incident types comprises a third control mode; the environmental incident information comprises an expiry time of the environmental incident; at the expiry time of the environmental incident, the processing module correspondingly selects the third control mode according to the matched predetermined environmental incident type, and the control module controls each of the plurality of loads to run according to the activation priority order of each of the plurality of loads in the third control mode.

5. The power control system as claimed in claim 3, wherein at the predetermined time before the beginning time of the environmental incident, the processing module sends the matched predetermined environmental incident type and the activation priority order of each of the plurality of loads in the first control mode to a mobile device.

6. The power control system as claimed in claim 5, wherein at the beginning time of the environmental incident, the processing module sends the matched predetermined environmental incident type and the activation priority order of each of the plurality of loads in the in the second control mode to the mobile device.

7. The power control system as claimed in claim 1, wherein the plurality of loads of the electricity consuming field are connected to a power grid; the at least one data source comprises a detecting device generating the environmental incident information upon detecting that a power state abnormality occurs in the power grid.

8. A power control method, which is applied to an electricity consuming field, wherein a plurality of loads is disposed in the electricity consuming field and is controllable to run; the power control method comprising:

- building a load control data comprising a plurality of control modes, wherein in each of the plurality of control modes, each of the plurality of loads has an activation priority order, and the activation priority order of at least a part of the plurality of loads in one of the plurality of control modes is different from the activation priority order of at least a part of the plurality of loads in another one of the plurality of control modes; the activation priority order of the plurality of loads of each of the plurality of control modes at least comprises either a first priority or a second priority;
- a mode selection step comprising receiving an environmental incident information from at least one data source through a processing module and selecting one of the plurality of control modes in the load control data corresponding to the environmental incident information according to the environmental incident information through the processing module; and
- a control step comprising controlling each of the plurality of loads to run through a control module according to the activation priority order of each of the plurality of loads in the one of the plurality of control mode selected by the processing module; when the control module receives an operation request signal corresponding to any one of the plurality of loads, and determines that the activation priority order of the load corresponding to the operation request signal is the first priority, the control module controls the load corresponding to the operation request signal to run; when the control module receives the operation request signal corresponding to any one of the plurality of loads, and determines that the activation priority order of the load corresponding to the operation request signal is the second priority, and the load in the first priority is not running, the control module controls the load in the second priority corresponding to the operation request signal to run.

9. The power control method as claimed in claim 8, comprising building a plurality of different predetermined environmental incident types, wherein each of the plurality of predetermined environmental incident types corresponds to at least one of the plurality of control modes; in the mode selection step, when the processing module determines that the environmental incident information received matches with one of the plurality of predetermined environmental incident types, the processing module correspondingly selects the at least one of the plurality of control modes according to the matched predetermined environmental incident type.

10. The power control method as claimed in claim 9, wherein at least one of the plurality of predetermined environmental incident types corresponds to at least two of the plurality of control modes comprising a first control mode and a second control mode; the environmental incident information comprises a beginning time of an environmental incident; during a predetermined time before the beginning time of the environmental incident, in the mode selection step, the processing module correspondingly selects the first control mode according to the matched predetermined environmental incident type, and in the control step, the control module controls each of the plurality of loads to run according to the activation priority order of each of the plurality of loads in the first control mode; at the beginning time of the environmental incident, in mode selection step, the processing module correspondingly selects the second control mode according to the matched predetermined environmental incident type, and in the control step, the control module controls each of the plurality of loads to run according to the activation priority order of each of the plurality of loads in the second control mode.

11. The power control method as claimed in claim 10, wherein the at least two of control modes corresponding to the at least one of the plurality of predetermined environmental incident types comprises a third control mode; the environmental incident information comprises an expiry time of the environmental incident; at the expiry time of the environmental incident, in the mode selection step, the processing module correspondingly selects the third control mode according to the matched predetermined environmental incident type, and in the control step, the control module controls each of the plurality of loads to run according to the activation priority order of each of the plurality of loads in the third control mode.

12. The power control method as claimed in claim 10, further comprising sending the matched predetermined environmental incident type and the activation priority order of each of the loads in the first control mode to a mobile device through the processing module at the predetermined time before the beginning time of the environmental incident.

13. The power control method as claimed in claim 12, further comprising sending the matched predetermined environmental incident type and the activation priority order of each of the plurality of loads in the second control mode to the mobile device through the processing module.

14. The power control method as claimed in claim 8, wherein the plurality of loads of the electricity consuming field are connected to a power grid; the at least one data source comprises a detecting device generating the environmental incident information upon detecting that a power state abnormality occurs in the power grid.

* * * * *